TUBE FINS OF OUTWARDLY-ORGANIZED MATERIALS

Original Filed July 26, 1971

INVENTOR.
HERBERT W. COOPER

United States Patent Office

Re. 28,115
Reissued Aug. 13, 1974

28,115
TUBE FINS OF OUTWARDLY-ORGANIZED MATERIALS

Herbert Wayne Cooper, Jericho, N.Y., assignor to Escoa Fintube Corporation, Pryor, Okla.

Original No. 3,731,738, dated May 8, 1973, Ser. No. 165,945, July 26, 1971. Application for reissue Aug. 20, 1973, Ser. No. 390,026
Int. Cl. F28f *21/02*
U.S. Cl. 165—180 7 Claims

Matter enclosed in heavy brackets [ ] appears in the original patent but forms no part of this reissue specification; matter printed in italics indicates the additions made by reissue.

ABSTRACT OF THE DISCLOSURE

This disclosure teaches a finned tube (or studded tube or the like) for convection sections of process heaters or boilers to improve heat transfer and reduce pressure drops of both process streams and flue gas. Tubes in this service are preferably of carbon steel which is, within this context, a relatively-high heat-conducting but relatively-low heat-resisting material. The finned tube is made of at least two materials organized proximally and distally relative the tube wall to which it is connected and from which it projects outwardly. The distal portion is made of a relatively-high heat-resisting but relatively-low heat-conducting material such as stainless steel. The proximal portion may be of a material the same as that of the tube wall or it may be of a material with heat-conducting and heat-resisting properties intermediate those of the tube wall and of the distal portion.

BACKGROUND OF THE INVENTION

In designing a convection section for a process heater or a boiler, desirable size of the convection section and allowable pressure drops make finned tube attractive. The fins offer added heat transfer surface thereby reducing the number of tubes necessary for a given service and consequently reducing pressure drop of flue gas passing thereacross. The reduced number of tubes and related bends also reduce the pressure drop of the process stream passing therethrough. However, when a relatively-high temperature of flue gas is encountered, a problem arises of excessive heating and consequent physical deterioration of fin tips whose temperatures rise to substantially hotter levels than those of the tube walls to which they are attached.

One approach posed for solution of this problem has been to make tubes of a relatively-high heat-conducting but relatively-low heat-resisting material (such as carbon steel) while making the fins of a relatively-high heat-resisting material (such as stainless steel). However, this approach is limited by the fact that the relatively-high heat-resisting materials (including stainless steel) lack high heat-conducting capacity.

Another approach posed for solution of this problem has been to reduce height and/or adjust other geometric proportions of the fins, but that approach generally augers against heat transfer capacity and is counter productive to overall design results.

Accordingly there are numerous instances wherein furnace and/or boiler designers find it desirable to use finned tubes in applications where there is a high flue gas temperature, but they have been frustrated in this endeavor. Thus the matter has persisted for decades.

*Significance of the present disclosure will be appreciated from a review of prior art. Prior art of interest includes British Pat. 779,769 to Griscom-Russell; U.S. Pats. 1,895,287 to Lambert; 2,226,291 to Wall; 2,273,157 to Tenney; 2,719,354 to Dalin and 2,731,245 to McChesney.*

*British Pat. 779,769 to Griscom-Russell taught use of corrosion resisting cladding on finned tubes, introducing thereby inherent problems of cladding into manufacture of finned tubes.*

*U.S. Pat. 1,895,287 to Lambert used tapered plate fins. Lambert was concerned with radiators and he did not consider temperature problems with which the present application copes.*

*U.S. Pat. 2,226,291 to Wall employed a second metal as an aid in manufacturing and attaching aluminum fins to tubes. Wall was concerned with strip fins. Wall did not discuss nor did he solve the problem of resistance to high temperature that the present application solves.*

*U.S. Pat. 2,273,157 to Tenney presented a binding strip folded over the outside edges of fins to strengthen the fins and to protect workmen's hands. There is no discussion by Tenney of any high temperature problem.*

*U.S. Pat. 2,719,354 to Dalin disclosed use of an inner core of one metal and a covering sheath of another metal for construction of a cylindrical extended surface. Dalin is distinguished from the present application because the proximal and the distal portions of the fins do not penetrate into or overlap each other in the present application.*

*U.S. Pat. 2,731,245 to McChesney shows various methods of attaching fins to conduits. Only aluminum fins are discussed and there is no discussion of selection of other metals, thermal conductivities, or temperature resistance.*

BRIEF STATEMENT OF INVENTION

Doctor Cooper has solved the foregoing problem by a novel, inventive and particularly facile approach. He has developed a finned tube with the fin having at least two materials arranged proximally and distally relative the tube wall to which it is attached and from which it projects outwardly. By making only the distal portion of the fin of a relatively-high heat-resisting but relatively-low heat-conducting material (such as stainless steel) the tube wall can be a relatively-high heat-conducting but relatively-low heat-resisting material (such as carbon steel). The proximal portion of the fin may be of the same material as that of the tube wall or it may be of a material intermediate between that of the tube wall and that of the distal portion in heat-conducting and heat-resisting properties. Therefore, one object of this invention (inter alia) is to increase heat transfer of convection tubes.

Another object of this invention is to increase the useful life of fins on convection tubes and prevent their deterioration.

Still another object of this invention is to reduce the number of tubes required in a convection section.

Still another object of this invention is to reduce the pressure drop of a flue gas in a convection section.

Still another object of this invention is to reduce the pressure drop in the process stream passing through the tube.

Still another object of this invention is to reduce the size of a convection section.

Still another object of this invention is to provide finned tubes which are simple and inexpensive to manufacture as well as capable otherwise of serving their intended functions.

BRIEF DESCRIPTION OF DRAWING

Other features and advantages will be understood from the following detailed description of preferred embodiments of the invention viewed in conjunction with the accompanying drawing wherein like numerals denote like parts and wherein.

DESCRIPTION OF PREFERRED EMBODIMENTS

Figure 1:
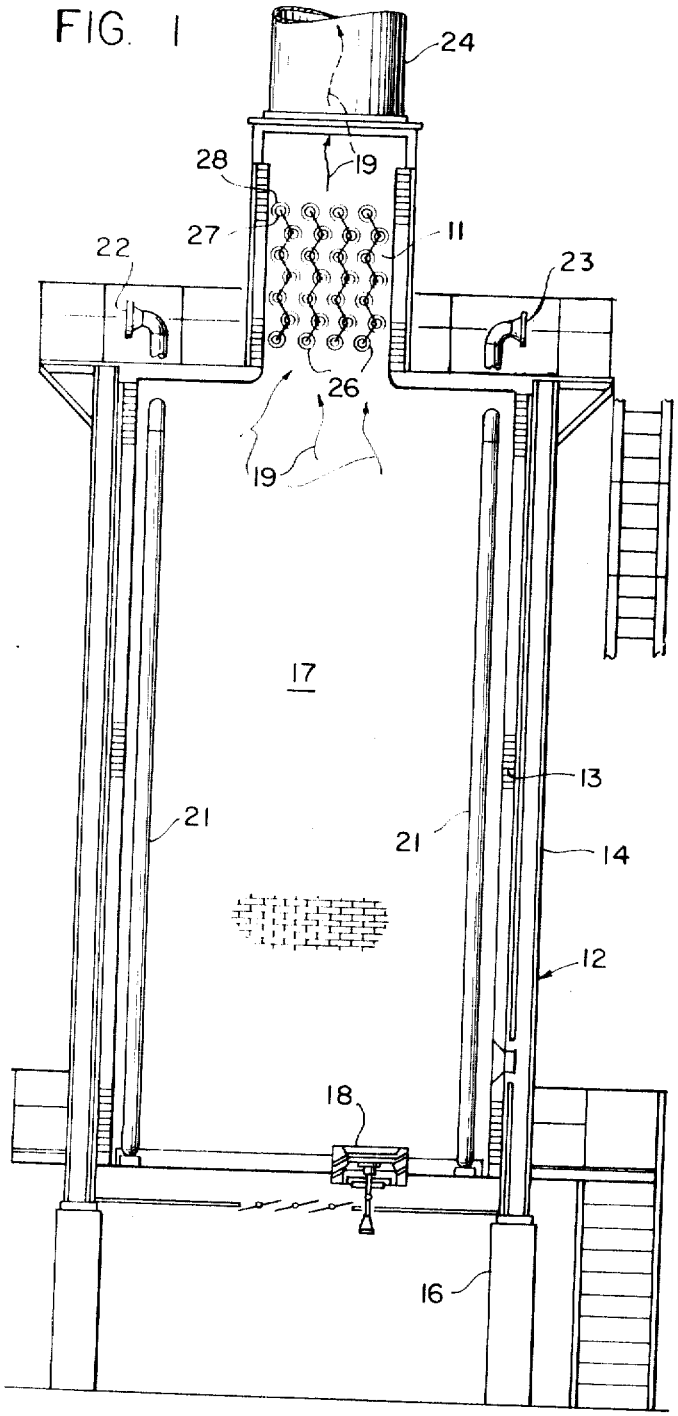
FIG. 1 is an illustrative process heater embodying the present invention.

The invention pertains particularly to a convection section 11 of a process heater or boiler 12 illustrated typically as a process heater in FIG. 1. Process heater 12 is comprised of a refractory setting 13 supported by structural frame 14 mounted in turn on piers 16. Setting 13 embraces radiation chamber 17 into which burner 18 penetrates for delivery of fuel and combustion-supporting air to produce hot flue gas generally designated 19. Radiant tubes 21 with inlet 22 and outlet 23 are disposed in radiation chamber 17 for heat absorption predominantly by means of radiant transfer mechanism. Flue gas 19 exits to stack 24 via convection section 11 in which convection tube 26 are mounted for heat absorption predominantly by means of convective transfer.

Figure 3:
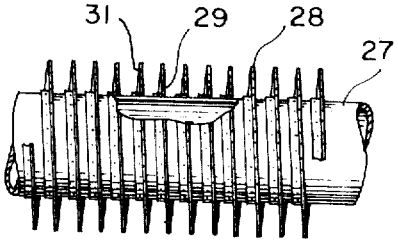
FIG. 3 is a partially broken longitudinal view of a finned tube according to the embodiment of FIG. 2.
Figure 2:
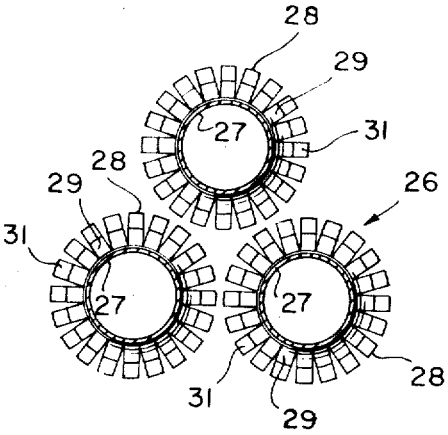
FIG. 2 is a cross section of finned tubes according to one embodiment of the present invention.

As seen in FIGS. 2 and 3, finned tubes 26 include tube walls 27 with fins 28 connected thereto (usually by welding) and projecting outwardly therefrom. Fins 28 have proximal portions 29 adjacent tube walls 27 and distal portions 31 remote therefrom. Fins 28 of FIG. 2 are serrated and wrapped helically about cylindrical tube walls 27. It will be understood that fins 28 need not be serrated, nor need they be wound helically. Fins 28 could likewise be in the form of studs or otherwise within the context of this disclosure.

According to the teaching of this invention, tube walls 27 and proximal portions 29 are made preferably of carbon steel or a like relatively-high heat-conducting and relatively-low heat-resisting material. Of course, modified carbon steels, such as United States Steel Company's Cor-Ten A which is similar to carbon steel but has better corrosion resistance, are contemplated here along with carbon steel. The composition of Cor-Ten A is as follows:

| Element: | Percentage by weight |
|---|---|
| Carbon | 0.12–max. |
| Manganese | 0.2–0.5 |
| Phosphorus | 0.07–0.15 |
| Sulfur | 0.05–max. |
| Silicon | 0.25–0.75 |
| Copper | 0.25–0.55 |
| Chromium | 0.30–1.25 |
| Nickel | 0.65–max. |
| Iron | Bal. |

Figure 4:
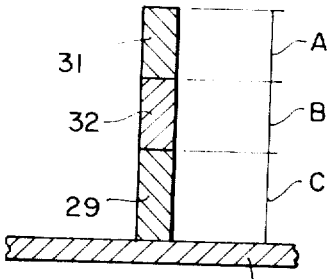
FIG. 4 depicts a somewhat idealized tube wall and fin assembly referred to in the example and having the fin made of one, two or three different materials.

Also according to the teaching of this invention, distal portions 31 are made of a relatively-low heat-conducting and relatively-high heat-resisting material such as stainless steel, preferably with one of the compositions set forth in Table I. As shown in FIG. 4, a second proximal portion 32 may also be included.

TABLE I.—NOMINAL COMPOSITIONS OF STAINLESS STEELS

| | Weight percent | | | | | | |
|---|---|---|---|---|---|---|---|
| | Cr | Ni | C, max. | Mn, max. | Si, max. | Mo | Fe |
| **Intermediate alloys** | | | | | | | |
| SS 410 | 11.5–13.5 | ------ | 0.15 | 1.0 | 1.0 | ------ | Bal. |
| SS 430 | 14–18 | ------ | 0.12 | 1.0 | 1.0 | ------ | Bal. |
| E2 (Crucible Steel Company). | 10.5–11.75 | 0.5 | 0.08 | 1.0 | 1.0 | ------ | Bal. |
| **High alloys** | | | | | | | |
| SS 304 | 16–20 | 8–11 | 0.08 | 2.0 | 1.0 | ------ | Bal. |
| SS 316 | 16–18 | 10–14 | 0.08 | 2.0 | 1.0 | 2–3 | Bal. |

Thermal conductivities and temperature limits of various materials are set forth in Table II.

TABLE II.—THERMAL CONDUCTIVITIES AND TEMPERATURE LIMITS

| Metal | Thermal conductivity (B.t.u./hr. ft., ° F.) | Maximum temperature (° F.) |
|---|---|---|
| Carbon steel | 24.1 | 900 |
| Cor-Ten A | 24.1 | 900 |
| 410 SS | 16.5 | 1,100 |
| 430 SS | 13.5 | 1,100 |
| E2 (Crucible Steel Company) | 16.5 | 1,200 |
| 304 SS | 12.6 | 1,500 |
| 316 SS | 12.6 | 1,500 |

EXAMPLE

A finned tube was placed in a flue gas stream of 1600° F., flowing at a rate such as to give a heat-transfer coefficient of 6 B.t.u./hr.-sq. ft.-° F. The tube metal was maintained at 745° F. Each fin was 1.50 inches high (total), 0.05 inches thick, and had a segment width of 0.25 inches. The maximum allowable fin metal temperatures were as follows:

| | ° F. |
|---|---|
| SS 304 | 1500 |
| 11% Chrome alloy | 1100 |
| Carbon steel | 900 |

It was found that fin tip temperatures were appreciably lower, and the amount of heat transferred was higher in multi-metal fins than in a fin consisting of only No. 304 stainless steel. The dimensions A, B and C in inches per FIG. 4 were as follows with A No. 304 stainless steel, B 11% chrome alloy and C carbon steel.

| | A | B | C |
|---|---|---|---|
| Case: | | | |
| 1 | 1.500 | 0.0 | 0.0 |
| 2 | 1.025 | 0.475 | 0.0 |
| 3 | 1.250 | 0.0 | 0.250 |
| 4 | 0.925 | 0.325 | 0.250 |

Tip temperatures and heat transfers were as follows:

| | Tip temperature (° F.) | Heat transfer (B.t.u./hr./fin |
|---|---|---|
| Case: | | |
| 1 | 1,365.0 | 15.22 |
| 2 | 1,344.5 | 16.28 |
| 3 | 1,333.5 | 17.10 |
| 4 | 1,320.0 | 17.61 |

It will be understood by those skilled in the design of convection sections and in heat transfer that wide deviations may be made from the foregoing preferred embodiments without departing from the main theme of invention set forth in the claims which follow.

I claim:

1. A heat-transfer tube, for use in a convection section of a process heater or boiler and arrangeable therein for passage of a fluid therethrough in noncontact heat-exchange relationship with a relatively-hot gas having a temperature of from 1000° to 2000° F., and characterized by:

a tube wall provided with at least one fin connected thereto and projecting outwardly therefrom;

the fin having a proximal portion integrally secured to the tube wall and a distal portion remote from the tube wall;

the distal portion continuous from the proximal portion and joined integrally thereto;

the tube wall and the proximal portion made of low carbon steel;

the distal portion made of a material selected from a group consisting of No. 410, No. 430, E2, No. 304 and No. 316 stainless steels.

2. The tube of claim 1 with the distal portion made of No. 410 stainless steel.

3. The tube of claim 1 with the distal portion made of No. 430 stainless steel.

4. The tube of claim 1 with the distal portion made of E2 stainless steel.

5. The tube of claim 1 with the distal portion made of No. 304 stainless steel.

6. The tube of claim 1 with the distal portion made of No. 316 stainless steel.

7. The tube of claim 1 with the proximal portion made of a material having heat-conducting and heat-resisting properties each intermediate those of the tube wall and the distal portion.

References Cited

The following references, cited by the Examiner are of record in the patented file of this patent or the original patent.

UNITED STATES PATENTS

| | | | |
|---|---|---|---|
| 1,802,695 | 4/1931 | Bennett | 29—196.6 |
| 2,464,735 | 3/1949 | Vanderweil | 165—180 |
| 3,393,445 | 7/1968 | Ulam | 29—196.1 X |

CHARLES J. MYHRE, Primary Examiner

T. W. STREULE, Jr., Assistant Examiner

U.S. Cl. X.R.

29—196.1, 196.6; 432—223